(12) United States Patent
Ma et al.

(10) Patent No.: US 11,430,472 B1
(45) Date of Patent: Aug. 30, 2022

(54) TRIPLE MAGNET LINEAR ACTUATOR MOTOR

(71) Applicant: Seagate Technology LLC, Fremont, CA (US)

(72) Inventors: YiChao Ma, Singapore (SG); Xiong Liu, Singapore (SG); Gordon Harwood, Minneapolis, MN (US); Yongjie Tang, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/528,296

(22) Filed: Nov. 17, 2021

(51) Int. Cl.
*G11B 5/39* (2006.01)
*G11B 5/48* (2006.01)
*H02K 41/035* (2006.01)

(52) U.S. Cl.
CPC ........ *G11B 5/4813* (2013.01); *H02K 41/0356* (2013.01)

(58) Field of Classification Search
None
See application file for complete search history.

(56) References Cited

U.S. PATENT DOCUMENTS

| | | |
|---|---|---|
| 4,034,613 A | 7/1977 | Halfhill et al. |
| 4,189,759 A | 2/1980 | Bauck et al. |
| 4,287,445 A | 9/1981 | Lienau |
| 4,322,840 A | 3/1982 | Kusaka |
| 4,376,294 A | 3/1983 | Meier et al. |
| 4,392,165 A | 7/1983 | Wright |
| 4,393,425 A * | 7/1983 | Wright ................. G11B 5/5521 360/75 |
| 4,462,054 A * | 7/1984 | Dong ................. H02K 41/0356 360/266.8 |
| 4,545,046 A | 10/1985 | Jansen et al. |
| 4,613,962 A | 9/1986 | Inoue et al. |
| 4,631,611 A | 12/1986 | Schneider |
| 4,663,682 A | 5/1987 | McNeil |

(Continued)

FOREIGN PATENT DOCUMENTS

FR 2749696 A1 12/1997

OTHER PUBLICATIONS

Notice of Allowance from U.S. Appl. No. 17/389,950, dated Feb. 16, 2022, 10 pages.

(Continued)

*Primary Examiner* — Peter Vincent Agustin
(74) *Attorney, Agent, or Firm* — Westman, Champlin & Koehler, P.A.

(57) ABSTRACT

A data storage device includes a ferromagnetic center pole, a drive coil for an actuator arm assembly, and a magnetic assembly surrounding the drive coil. The drive coil surrounds the center pole and has a top, a bottom, and first and second sides; the first side is attached to the actuator arm assembly. The magnetic assembly includes a top magnet disposed above and spaced from the center pole, a bottom magnet disposed below and spaced from the center pole, and a side magnet disposed proximate the second side of the coil and spaced from the center pole. In another embodiment, a linear actuator comprises a ferromagnetic center pole, a drive coil supported for linear motion on a rail, and a magnetic assembly. A method including linearly moving a drive coil along a center pole by a magnetic field is also described.

20 Claims, 5 Drawing Sheets

(56) References Cited

U.S. PATENT DOCUMENTS

| | | | |
|---|---|---|---|
| 4,672,490 A | 6/1987 | Shigenai et al. | |
| 4,703,375 A | 10/1987 | Chan et al. | |
| 4,740,946 A * | 4/1988 | Yumura | G01B 3/002 |
| | | | 720/666 |
| 4,742,410 A | 5/1988 | Smith | |
| 4,745,503 A | 5/1988 | Muraoka et al. | |
| 4,763,314 A | 8/1988 | McCaslin et al. | |
| 4,764,829 A | 8/1988 | Makino | |
| 4,792,707 A | 12/1988 | Katanuma | |
| 4,800,818 A | 1/1989 | Kawaguchi et al. | |
| 4,819,108 A | 4/1989 | Seki et al. | |
| 4,853,808 A * | 8/1989 | Lutz | H02K 41/0356 |
| 4,888,751 A | 12/1989 | Yoshimaru et al. | |
| 4,902,971 A | 2/1990 | Guzik et al. | |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,029,030 A | 7/1991 | Luecke | |
| 5,043,964 A | 8/1991 | Suzuki | |
| 5,229,901 A | 7/1993 | Mallary | |
| 5,317,552 A | 5/1994 | Yamasaki | |
| 5,396,385 A | 3/1995 | Tangi et al. | |
| 5,467,238 A | 11/1995 | Lee et al. | |
| 5,493,463 A | 2/1996 | Hagen | |
| 5,521,778 A | 5/1996 | Boutaghou et al. | |
| 5,801,531 A | 9/1998 | Viches et al. | |
| 5,825,180 A | 10/1998 | Guzik | |
| 5,875,166 A | 2/1999 | Ikegame et al. | |
| 5,968,627 A | 10/1999 | Nigam et al. | |
| 6,043,957 A | 3/2000 | Hattori et al. | |
| 6,064,550 A | 5/2000 | Koganezawa | |
| 6,157,521 A | 12/2000 | Utsunomiya | |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 | 3/2002 | Sampietro et al. | |
| 6,369,988 B1 | 4/2002 | Yoshida et al. | |
| 6,480,361 B1 | 11/2002 | Patterson | |
| 6,549,377 B2 | 4/2003 | Yoshida et al. | |
| 6,765,744 B2 | 7/2004 | Gomez et al. | |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,199,981 B2 | 4/2007 | Zabtcioglu | |
| 7,372,671 B2 | 5/2008 | Yazawa | |
| 7,375,930 B2 | 5/2008 | Yang et al. | |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 9,424,866 B1 * | 8/2016 | Cao | G11B 7/124 |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 | 12/2019 | Granz et al. | |
| 10,622,012 B1 | 4/2020 | Tu et al. | |
| 10,699,730 B1 | 6/2020 | Uefune et al. | |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,978,100 B1 | 4/2021 | Myers | |
| 11,037,590 B2 | 6/2021 | Nguyen et al. | |
| 11,062,734 B1 | 7/2021 | Brand | |
| 11,120,834 B1 | 9/2021 | Herdendorf et al. | |
| 2004/0008609 A1 | 1/2004 | Fujibayashi et al. | |
| 2004/0087253 A1 | 5/2004 | Mahadev | |
| 2004/0130320 A1 | 7/2004 | Guzik et al. | |
| 2004/0179465 A1 | 9/2004 | Kuwajima et al. | |
| 2004/0257710 A1 | 12/2004 | Limmer et al. | |
| 2005/0225875 A1 | 10/2005 | Wada et al. | |
| 2005/0280945 A1 | 12/2005 | Duvall et al. | |
| 2006/0171068 A1 * | 8/2006 | Taguchi | G11B 5/1278 |
| 2007/0279804 A1 | 12/2007 | White | |
| 2008/0084636 A1 | 4/2008 | Oh et al. | |
| 2009/0073608 A1 * | 3/2009 | Ookawa | G11B 5/1278 |
| | | | 360/125.03 |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2016/0171993 A1 | 6/2016 | Okubo | |
| 2018/0301162 A1 | 10/2018 | Erden | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2021/0312945 A1 | 10/2021 | Mendonsa et al. | |

OTHER PUBLICATIONS

Supplemental Notice of Allowance from U.S. Appl. No. 17/233,818, dated Feb. 24, 2022, 3 pages.

Notice of Allowance from U.S. Appl. No. 17/233,818, dated Feb. 2, 2022, 7 pages.

Requirement for Restriction/Election from U.S. Appl. No. 17/233,818, dated Sep. 20, 2021, 6 pages.

Applicant Initiated Interview Summary from U.S. Appl. No. 17/233,818, dated Nov. 15, 2021, 2 pages.

U.S. Appl. No. 16/863,287, filed Apr. 30, 2020, "Split Ramp for Data Storage Devices", issuing as U.S. Pat. No. 11,094,347 on Aug. 17, 2021, 22 pages.

U.S. Appl. No. 17/163,983, filed Feb. 1, 2021, entitled "Ramp Activation Systems for an Elevator Drive", 34 pages.

U.S. Appl. No. 17/233,818, filed Apr. 19, 2021, entitled "Zero Skew Elevator System", 51 pages.

Non-Final Rejection for U.S. Appl. No. 17/233,818, Notification Date: Oct. 22, 2021, 8 pages.

He, Zhimin et al., "Mechanisms of Minimum Skew Angle Actuation for Hard Disk Drives", A*Star, Data Storage Institute, 2 Fusionopolis Way, #08-01, Innovis, Singapore 138634, MATEC Web of Conferences 42, 02002 (2016), DOI: 10.1051/matecconf/20164202002, © Owned by the authors, published by EDP Sciences, 2016, 5 pages.

Cordle, Michael, "Effects of Skew Angle and Transition Curvature in HAMR Hard Disk Drives", A Thesis Submitted to the Faculty of the University of Minnesota, May 2017, 63 pages.

U.S. Appl. No. 17/196,192, filed Mar. 9, 2021, "Rotating Ramp With Retraction Capability for a Disk Drive", 33 pages.

U.S. Appl. No. 17/016,326, filed Sep. 9, 2020, "Brake Crawler for Elevator-Type Hard Disk Drives", 30 pages.

U.S. Appl. No. 17/223,447, filed Apr. 6, 2021, "Data Storage Device Linear Actuator", 36 pages.

U.S. Appl. No. 17/172,684, filed Feb. 10, 2021, "Adjusting HGA Z-Height Via HSA Elevator Using Head/Actuator Feedback", 24 pages.

U.S. Appl. No. 17/389,950, filed Jul. 30, 2021, "Zero Skew Disk Drive With Dual Actuators", 56 pages.

Office Action from U.S. Appl. No. 17/389,950, dated Nov. 16, 2021, 8 pages.

* cited by examiner

TRIPLE MAGNET LINEAR ACTUATOR MOTOR

SUMMARY

In one embodiment, a data storage device comprises a ferromagnetic center pole, a drive coil for an actuator arm assembly, and a magnetic assembly surrounding the drive coil. The drive coil surrounds the center pole and has a top, a bottom, and first and second sides; the first side is attached to the actuator arm assembly. The magnetic assembly comprises a top magnet disposed above and spaced from the center pole, a bottom magnet disposed below and spaced from the center pole, and a side magnet disposed proximate the second side of the coil and spaced from the center pole.

In another embodiment, a linear actuator comprises a ferromagnetic center pole, a drive coil supported for linear motion on a rail, and a magnetic assembly. The drive coil surrounds the center pole and comprises first, second, third and fourth sides. The magnetic assembly surrounds the drive coil on at least the first, second and third sides and comprises a first magnet disposed proximate the first side of the coil and spaced from the center pole, a second magnet disposed proximate the second side of the coil and spaced from the center pole, and a third magnet disposed proximate the third side of the coil and spaced from the center pole.

In yet another embodiment, a method comprises supporting a read/write head for linear motion along a rail attached to a drive coil; applying electrical current to the drive coil, the drive coil surrounding a linear ferromagnetic center pole that is disposed parallel to the rail; and linearly moving the drive coil along the center pole by a magnetic field generated by: a top magnet disposed above and spaced from the center pole; a bottom magnet disposed below and spaced from the center pole; and a side magnet disposed proximate a side of the coil and spaced from the center pole.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
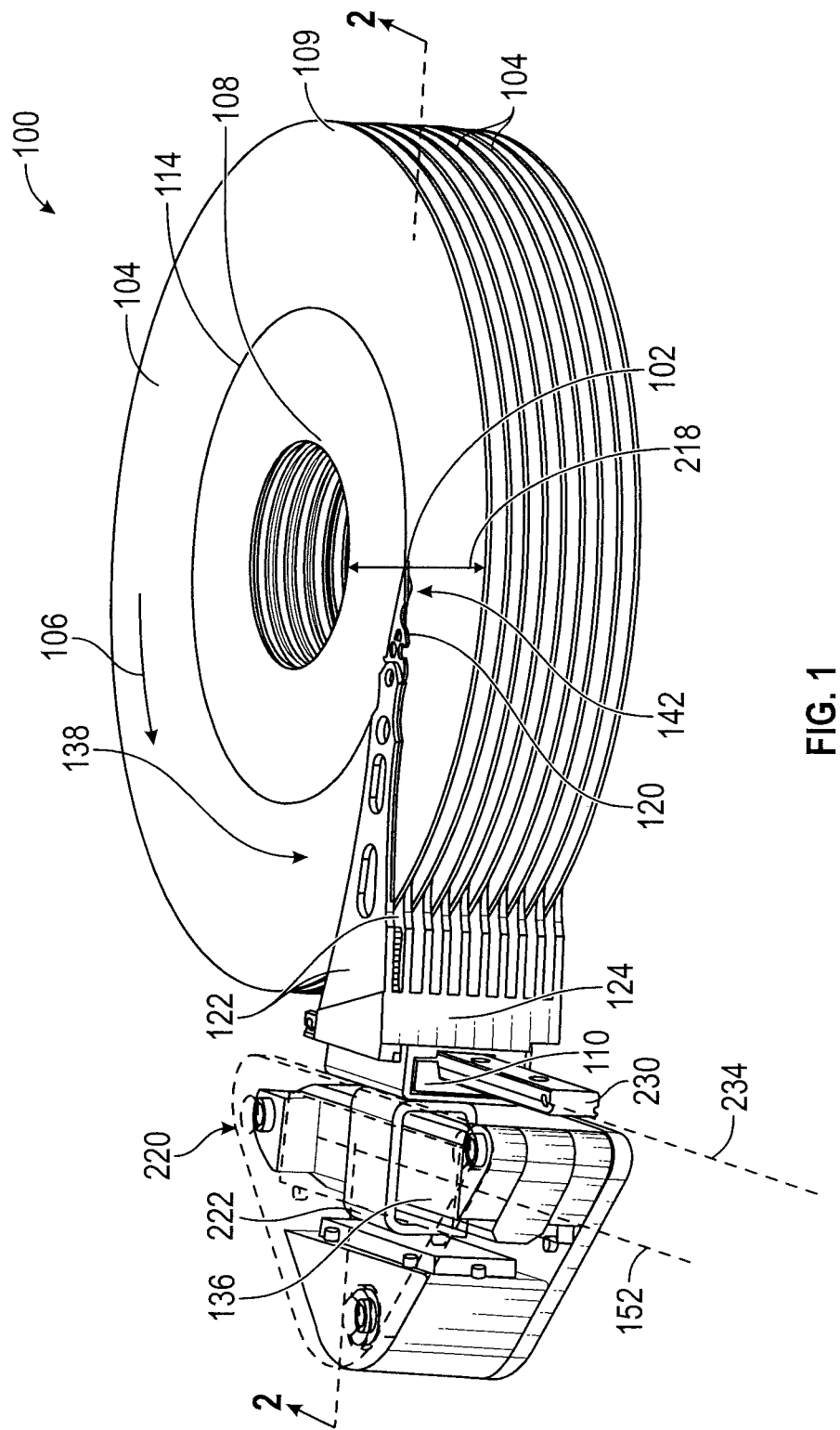
FIG. 1 is a perspective view of components of an exemplary data storage device.

Embodiments of the disclosure relate to increasing magnetic force generation in a linear actuator for a data storage device (DSD) that is simple to assemble and robust in operation. Prior to providing details regarding the different embodiments, a description of a suitable operating environment is provided below in connection with FIG. 1, which is for illustrative purposes only. Embodiments of the present disclosure are not limited to any particular operating environment and can be practiced within any number of different types of operating environments.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a perspective illustration of components of a data storage device (DSD) 100. In an exemplary embodiment, DSD 100 includes data storage media or disks 104 and heads 102 for reading data from and/or writing data to the data storage media 104. In an exemplary embodiment, the data storage media 104 are rotatable data storage disks stacked on a spindle (not shown), with each disk 104 having opposing surfaces that serve as data storage surfaces. For read and write operations, the media 104 rotate as illustrated by arrow 106. A linear actuator assembly 220 positions the heads 102 relative to data tracks 114 on the rotating media 104 between an inner diameter (ID) 108 and an outer diameter (OD) 109. The spindle and linear actuator assembly 220 are connected to and operated through drive circuitry (not shown).

In an exemplary embodiment, each of heads 102 is coupled to the linear actuator assembly 220 through a suspension assembly that includes a load beam 120 connected to an actuator arm 122. In an exemplary embodiment, a plurality of actuator arms 122 are attached to E-block base 124. The linear actuator assembly 220 is coupled to a frame or base deck of DSD 100 and moves the head 102 in a cross-track direction as illustrated by radius 218. Each of the heads 102 includes one or more transducer elements (not shown) coupled to head circuitry, such as through a flex circuit. The linear actuator assembly 220, the load beams 120 and the actuator arms 122 are collectively referred to as a head stack assembly (HSA) 138.

In general, in order to keep read/write heads 102 from landing on disks 104 in a data storage device when, for example, power is removed from the data storage device, and to prevent the heads 102 from colliding with outer edges of the disks 104 during load and unload operations, a head support ramp assembly (not shown) is provided adjacent to the OD 109 of the disks 104 at an end of radius 218. A head support ramp assembly supports head end 142 of HSA 138 when the actuator arms 122 are moved away from the data storage disk(s) 104. In some embodiments, a lift tab extends from the load beam 120 to rest on the head support ramp assembly when the disk drive storage device is in an off or non-operating state. For use of heads 102 for reading and writing data relative to disk 104, actuator 220 is activated to slide the E-block base 124, to thereby move the head ends 142 of the actuator arms 122 off of the head support ramp assembly and to the disks 104, as shown in FIG. 1. Ramp configurations can include those described in the following commonly owned patent applications, which are hereby incorporated by reference: U.S. application Ser. No. 16/863, 287 filed on Apr. 30, 2020, entitled "Split Ramp for Data Storage Devices;" and U.S. application Ser. No. 17/163,983 filed on Feb. 1, 2021, entitled "Ramp Activation Systems for an Elevator Drive."

In an exemplary embodiment, linear actuator assembly 220 allows for zero skew (or fixed skew) throughout the entire stroke of the head stack assembly 138. The radial cross-track direction of travel 218 places the head 102 in alignment with any track 114 of disk 104. This allows for increased density of a data storage compared to a device with a rotating actuator arm. For example, by configuring the head 102 to have zero skew (no angular offset to a centerline of a track 114 in the x-y plane, which is defined by the disk surface) throughout the entire stroke of the head end 142 of HSA 138, the head 102 may be able to read data immediately after writing the data. In contrast, in a conventional skewed configuration, the angle of the head 102 relative to the data track 114 (such as that resulting from a stroke extending along an arc about an actuator arm pivot axis) may not allow for this immediate reading after writing. Additional information relevant to high performance of a disk drive is provided in the following commonly owned patent applications and patents, which are hereby incorporated by reference: US Published Patent Application No. 2004/0257710 for "Hard drive actuator arm with reduced skew variation" and U.S. Pat. No. 6,987,637 for "Magnetic recording system which eliminates skew angle effect."

Figure 2:
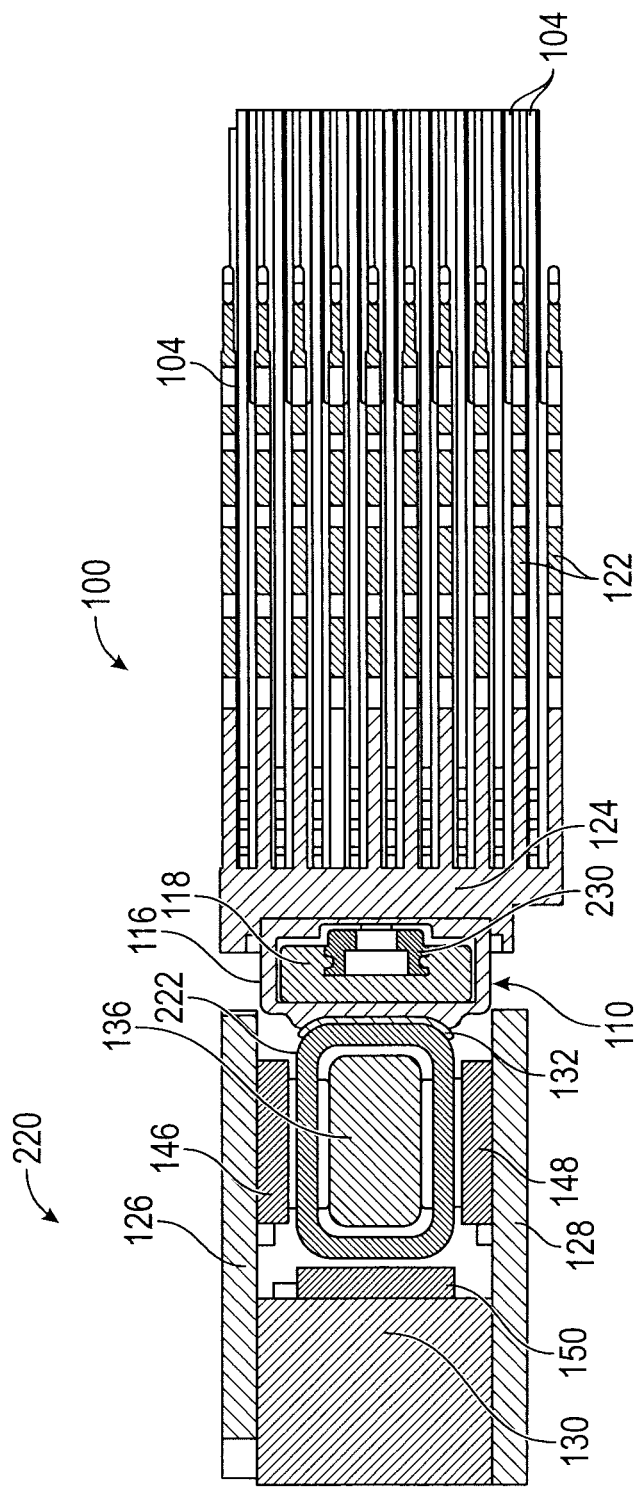
FIG. 2 is a cross sectional view taken along line 2-2 of FIG. 1.

FIGS. 1 and 2 depict embodiments of a fully populated DSD 100, wherein a plurality of actuator arms 122 are provided to reach the read/write surfaces of the plurality of stacked disks 104. The linear actuator descriptions herein can also be applied to a DSD in which the number of disk surfaces exceeds the number of read/write heads. In that case, an elevator could be used to move the actuator arms up and down in a z direction to position the read/write heads relative to a desired disk surface. Suitable elevator systems are described in the following commonly owned patent application, which is hereby incorporated by reference: U.S. application Ser. No. 17/233,818 filed on Apr. 19, 2021, entitled "Zero Skew Elevator System."

In an exemplary embodiment, the linear actuator assembly 220 of the data storage device 100 has longitudinal rail 230 extending along a rail axis 234 that is parallel to radius 218 of disk 104. The rail 230 may include or be formed of any suitable material, such as stainless steel or titanium, for example. In an exemplary embodiment, rail 230 is attached proximate its two ends to a deck of the DSD 100. These conventional support structures are not shown. Carriage 110 slides on rail 230 and supports a linear motor coil 222 and actuator arms 122. In an exemplary embodiment, the actuator arms 122 are movably attached to rail 230 such that motion in the x-y plane is restricted to sliding motion along the rail 230. In other words, the actuator arms 122 may be movably attached to the rail 230 so that the actuator arms 122 and E-block base 124 move linearly and, therefore, the at least one head 102 also moves linearly relative to the recording medium 104. While only a single head 102 is shown in the illustrations, it is to be understood that in DSD 100, one or more heads would be carried by each of the actuator arms 122, for interaction with each disk surface of the stack of disks 104. While a single rail is illustrated, it is contemplated that E-block base 124 can slide along two or more parallel rails in another embodiment.

Figure 3:
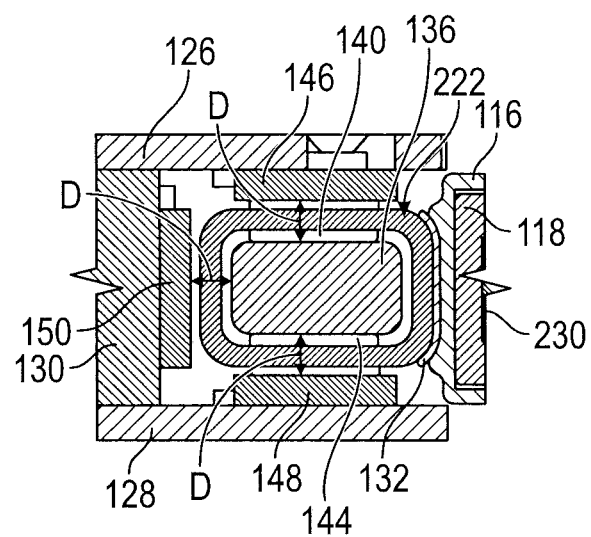
FIG. 3 is an enlarged view of a portion of FIG. 2.
Figure 4:
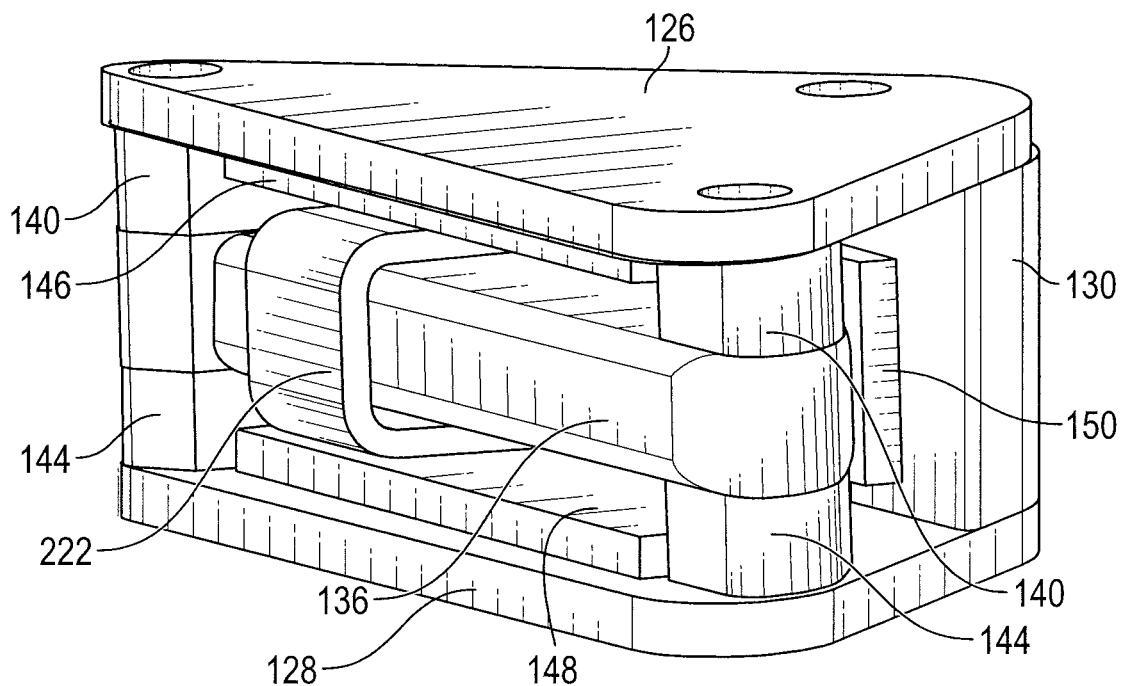
FIG. 4 is a perspective view of an exemplary linear actuator assembly.

In an exemplary embodiment, the linear actuator assembly 220 of the data storage device includes a linear motor for moving carriage 110 along rail 230. In FIG. 1, a top plate of linear actuator assembly 220 is shown as transparent so that other structures are visible. In an exemplary embodiment, as shown in FIGS. 1-3, carriage 110 is mounted between E-block base 124 of actuator arms 122 and a coil 222 of the linear motor. In an exemplary embodiment as shown in FIG. 2, carriage 110 includes a casing 116 that houses guideway 118 for rail 230. In an exemplary embodiment, casing 116 is attached to the voice coil 222 by use of adhesive layer 132. In the illustrated embodiment, the linear motor is a voice coil motor having copper coil 222. Accordingly, activation of linear motor 222 causes actuator arms 122 and their heads 102 to move linearly with the carriage 110 along rail 230. Thus, the at least one head 102 positioned on the head end 142 of the actuator arms 122 moves in a straight line 218, radially over the recording medium 104. Thus, for the entire stroke of motion along radius 218, no skew is introduced between the head 102 and any disk track, of which one track 114 is an example.

Figure 5:
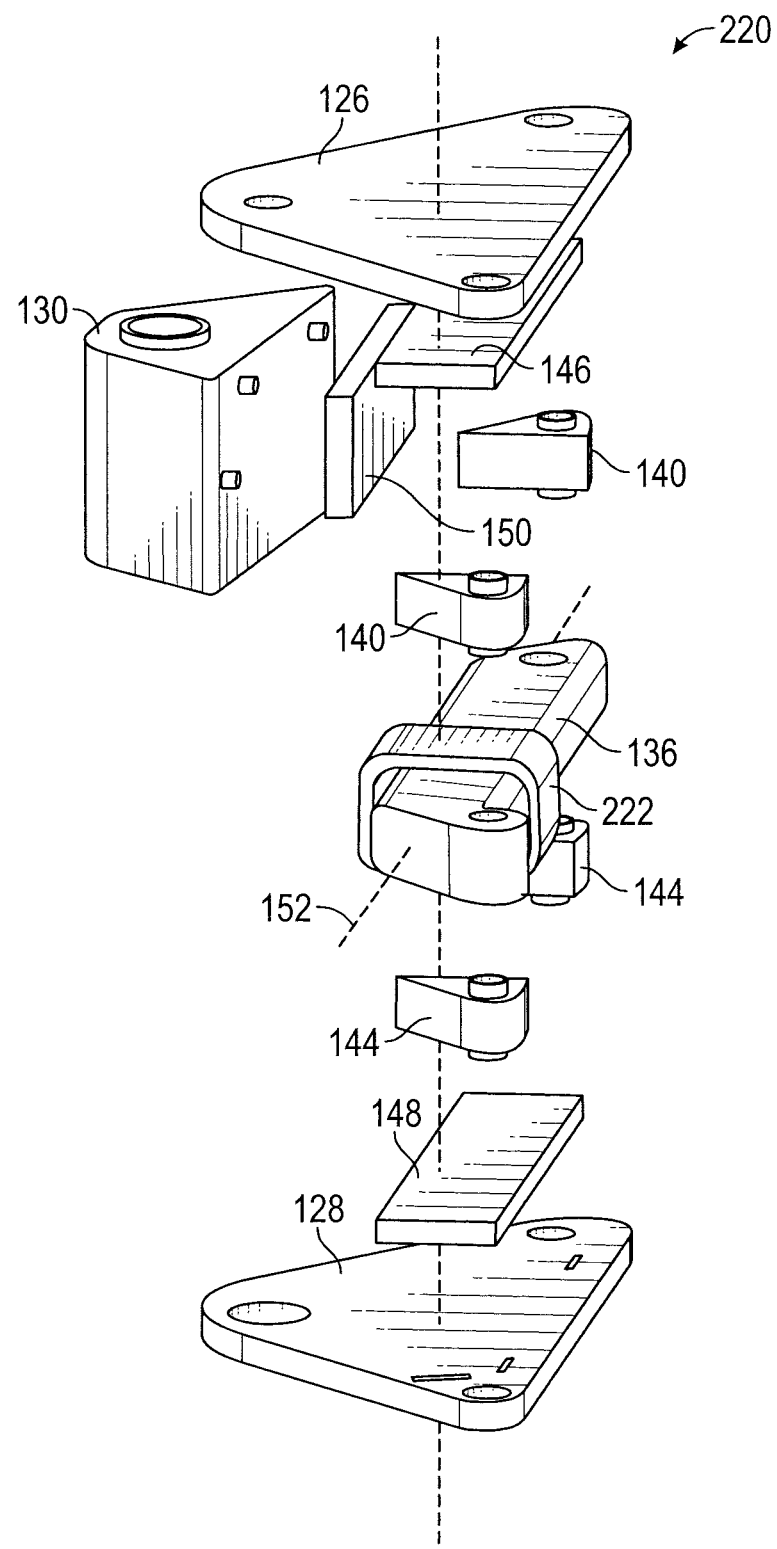
FIG. 5 is a perspective exploded view of the exemplary linear actuator assembly.

FIG. 5 is an exploded view of components of an exemplary linear actuator assembly 220, which include top pole plate 126, bottom pole plate 128, and back pole support spacer 130. Each of these poles supports a magnet: top magnet 146, bottom magnet 148, and back magnet 150, respectively. In some cases, the back pole support spacer 130 and back magnet 150 are referred to as a side pole support spacer and side magnet. In an exemplary embodiment, the top pole plate 126 and bottom pole plate 128 are held in spaced relationship by back or side pole support spacer 130, which can include an integral supporting pin. Center pole 136 is held in position between top pole plate 126 and bottom pole plate 128 by top spacers and bottom spacers 140, 144, respectively. In an exemplary embodiment, linear motor coil 222 surrounds center pole 136 and is slidable linearly along longitudinal axis 152 of center pole 136. Longitudinal axis 152 of center pole 136 is parallel to rail axis 234 of rail 230 and is parallel to radius 218 of disk 104.

As shown in FIGS. 2-5, for example, the permanent magnets 146, 148, 150 surround the linear motor coil 222 on three sides thereof. Each magnet is backed by a respective flux returning pole 126, 128, 130. Further, each of the three permanent magnets 146, 148, 150 is magnetized in a direction normal to its face surface. In an exemplary embodiment, each of the magnets 146, 148, 150 is oriented so that its north pole faces the coil 222 and its south pole faces the respective pole 126, 128, 130 (also referred to as top pole plate 126, bottom pole plate 128 and back or side pole support spacer 130). In another embodiment, each of the magnets 146, 148, 150 is oriented so that its south pole faces the coil 222 and its north pole faces the respective pole 126, 128, 130. With either orientation of the set of magnets, a substantial portion of the length of the coil 222 is effectively used for force generation, thereby achieving a drive capacity gain over other linear motor designs in which a coil has less magnetic exposure. The described linear actuator assembly 220 may achieve a force constant of 1.68 Newtons per Ampere.

As shown in FIG. 3, in an exemplary embodiment, an air gap distance D between the center pole 136 and each of the permanent magnets 146, 148, 150 is uniform. Moreover, a gap between coil 222 and center pole 136 is substantially uniform around the center pole 136. This structure leads to a constant magnetic field in the linear actuator assembly 220. This consistent spacing and the use of three permanent magnets surrounding three sides of the coil 222 result in a motor for a linear actuator assembly 220 that effectively increases the drive force constant of the motor without substantial increase in space usage.

In an exemplary embodiment, the substantially rectangular cross-sectional shape of the coil 222 has two longer sides (top and bottom) and two shorter sides (left and right as illustrated). Permanent magnets 146, 148, 150 are provided on both of the longer sides and one of the shorter sides. In an exemplary embodiment, each of the top and bottom magnets 146 and 148 is mutually spaced apart in a parallel manner, and the back magnet 150 is oriented perpendicularly to both the top and bottom magnets 146 and 148. Only the other of the shorter side of the coil 222 (which is attached to carriage 110 by adhesive 132) is not directly subjected to a magnetic field. Thus, in an exemplary embodiment, more than three quarters of the length of the linear motor coil 222 is subjected to a magnetic field. Accordingly, the efficiency of the disclosed linear actuator assembly 220 is higher than in other designs in which the coil has less magnetic exposure.

Each of the poles 126, 128, 130 and the center pole 136 is ferromagnetic. In an exemplary embodiment, each of top pole 126 and bottom pole 128 is configured as a plate, and back or side pole 130 is configured as a support spacer. Where the linear motor coil 222 has a substantially rectangular cross-sectional shape, the center pole 136 similarly has a corresponding substantially rectangular shape, though the corners are radiused to provide a consistent distance between the center pole's exterior surface and the coil's interior surface. The plurality of magnets 146, 148, 150 establish a magnetic field through which the coil 222, upon application of a current, is advanced along the longitudinal axis 152 of the center pole 136. Thus, this center pole 136 serves the dual function of conducting magnetic flux and guiding the coil 222 and its attached actuator arm assembly on a linear trajectory.

The spacing distances also provide room around the center pole 136 in which the coil 222 can travel for its full stroke without physical interference from the magnets 146, 148, 150 or other structures. In an exemplary embodiment, rail 230 is fixed to a base or frame of the data storage device 100. Carriage 110 is attached to coil 222 on one side thereof and to E-block base 124 on the other side. Movement of carriage 110 and its attached structures is restricted to linear motion along axis 234 of rail 230. In an exemplary embodiment, coil 222, being supported on rail 230, has no physical contact with the center pole 136, magnets 146, 148, 150, or spacers of the linear actuator 220. Rather, coil 222 travels in a space outside the center pole 136 and inside of the magnets 146, 148, 150 and spacers 130, 140, 144. The described structure of linear actuator assembly 220 is simple to put together, as shown in FIG. 5 (with conventional fasteners not shown), and robust in operation and maintenance. Because of the lack of physical contact between coil 222 and center pole 136, no bearings in those spaces are required. Few mechanical parts are used, leading to reliable operation with little concern for binding or physical interference of structural parts.

In an exemplary embodiment, the permanent magnets 146, 148, 150 substantially surround the ferromagnetic center pole 136 and establish a magnetic field across the air gap having distance D, which separates the center pole 136 from the magnets 146, 148, 150. Ferromagnetic poles 126, 128, 130 and ferromagnetic spacers 140, 144 are provided to complete the magnetic circuit. When a suitable current is applied to the coil 222 by a current source, the coil 222 moves within the magnetic field of the air gap in a direction determined by a sign or direction of the current, and at a rate determined by an amplitude of such current. When the current is turned off, motion of the coil 222 along the longitudinal axis 152 of the center pole 136 ceases. In an exemplary embodiment, the distance D is small to promote strong magnetic field generation while maintaining a compact physical form factor. Thus, the described structures of the exemplary linear actuator assembly 220 provide for enhanced seek performance in a compact DSD that is easy to install and maintain.

Figure 6:
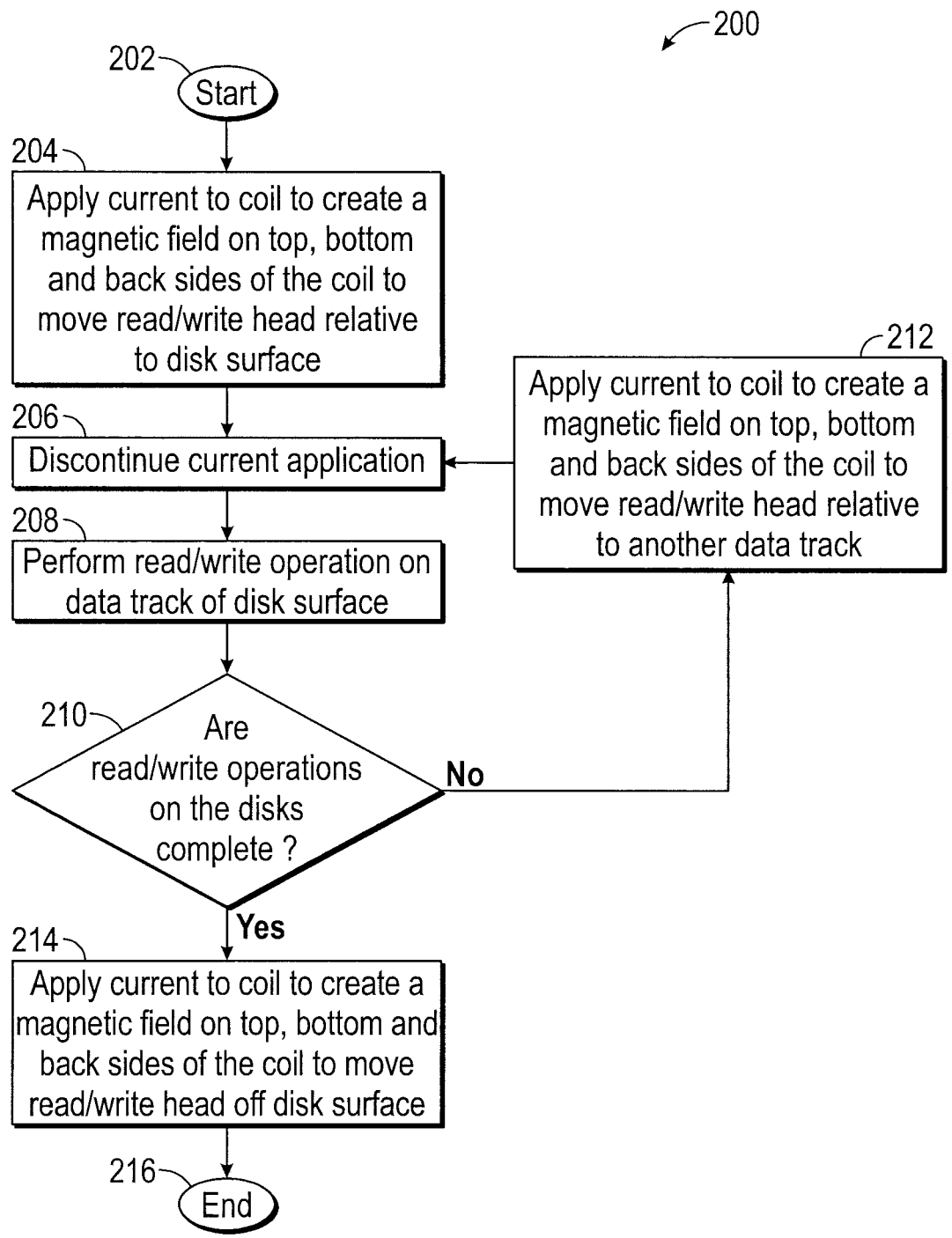
FIG. 6 is a flow chart illustrating an exemplary method of use of a data storage device.

FIG. 6 is a flow chart illustrating an exemplary method of use of the described data storage device 100. Method 200 starts at 202 and continues to 204, which includes applying an electric current to coil 222 to create a magnetic field on top, bottom and back sides of the coil in order to move the coil and an associated read write head 102 relative to the disc surface of data storage disc 104. At 206, the current application is discontinued to retain the read write head 102 in its position with respect to a data track 114 of the disc surface 104. At 208, a read/write operation is performed by the head 102 on the data track 114. At 210, a query asks if the read/write operations on the disc are complete. If not, a current is applied at 212 to move the read/write head relative to another data track 114 of the disc surface. The method continues at 206 and 208 until the query at 210 is answered in the affirmative. In that case, the method continues to 214, wherein application of current creates a magnetic field that moves the associated read/write head off the disc surface, such as to a head support ramp assembly, for example. The method ends at 216 with conclusion of the disc drive operation.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent and patent application documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a ferromagnetic center pole;
   a drive coil for an actuator arm assembly, the drive coil surrounding the center pole, wherein:
      the drive coil has a top, a bottom, and first and second sides; and
      the first side is attached to the actuator arm assembly; and
   a magnetic assembly surrounding the drive coil and comprising:
      a top magnet disposed above and spaced from the center pole;
      a bottom magnet disposed below and spaced from the center pole; and
      a side magnet disposed proximate the second side of the drive coil and spaced from the center pole.

2. The data storage device of claim 1 wherein each of the top magnet, the bottom magnet, and the side magnet is spaced at a consistent distance from the center pole.

3. The data storage device of claim 1 wherein there is no physical contact between the drive coil and the center pole.

4. The data storage device of claim 1 comprising a rail configured to support the drive coil, the rail defining a longitudinal axis of motion.

5. The data storage device of claim 4 comprising a carriage configured to travel along the longitudinal axis, and wherein the drive coil is attached to the carriage.

6. The data storage device of claim 5 wherein the actuator arm assembly is attached to the carriage.

7. The data storage device of claim 1 wherein each of the top magnet, the bottom magnet and the side magnet comprises a north pole facing the center pole and a south pole facing away from the center pole.

8. The data storage device of claim 7 comprising:
   a top ferromagnetic plate disposed adjacent the south pole of the top magnet;
   a bottom ferromagnetic plate disposed adjacent the south pole of the bottom magnet; and
   a side ferromagnetic support disposed adjacent the south pole of the side magnet.

9. The data storage device of claim 8 comprising:
   a top spacer disposed between the central pole and the top ferromagnetic plate; or
   a bottom spacer disposed between the central pole and the bottom ferromagnetic plate.

10. A linear actuator comprising:
    a ferromagnetic center pole;
    a drive coil supported for linear motion on a rail, the drive coil surrounding the center pole, the drive coil comprising first, second, third and fourth sides;
    a magnetic assembly surrounding the drive coil on at least the first, second and third sides and comprising:
       a first magnet disposed proximate the first side of the drive coil and spaced from the center pole;
       a second magnet disposed proximate the second side of the drive coil and spaced from the center pole; and
       a third magnet disposed proximate the third side of the drive coil and spaced from the center pole.

11. The linear actuator of claim 10 wherein each of the first magnet, the second magnet, and the third magnet is spaced at a consistent distance from the center pole.

12. The linear actuator of claim 10 wherein there is no physical contact between the drive coil and the center pole.

13. The linear actuator of claim 10 comprising a carriage configured to travel along the rail, and wherein the drive coil is attached to the carriage.

14. The linear actuator of claim 10 wherein each of the first magnet, the second magnet and the third magnet comprises a north pole facing the center pole and a south pole facing away from the center pole.

15. The linear actuator of claim 14 comprising:
    a first ferromagnetic plate disposed adjacent the south pole of the first magnet;
    a second ferromagnetic plate disposed adjacent the south pole of the second magnet; and
    a third ferromagnetic support disposed adjacent the south pole of the third magnet.

16. The linear actuator of claim 15 comprising:
    a first spacer disposed between the central pole and the first ferromagnetic plate; or
    a second spacer disposed between the central pole and the second ferromagnetic plate.

17. A method comprising:
    supporting a read/write head for linear motion along a rail attached to a drive coil;
    applying electrical current to the drive coil, the drive coil surrounding a linear ferromagnetic center pole that is disposed parallel to the rail; and
    linearly moving the drive coil along the center pole by a magnetic field generated by:
       a top magnet disposed above and spaced from the center pole;
       a bottom magnet disposed below and spaced from the center pole; and
       a side magnet disposed proximate a side of the drive coil and spaced from the center pole.

18. The method of claim 17 wherein linearly moving the drive coil results in linearly moving the read/write head along a radius of a data storage disk.

19. The method of claim 17 comprising supporting the read/write lead on an actuator arm attached to the rail.

20. The method of claim 19 comprising moving the actuator arm on the rail by a carriage.

\* \* \* \* \*